United States Patent [19]

Scott

[11] Patent Number: 4,721,971
[45] Date of Patent: Jan. 26, 1988

[54] PHOTOGRAPH LOGGING APPARATUS AND METHOD

[76] Inventor: Joel E. Scott, 445 S. Palm Ave., Apt. 1, Sarasota, Fla. 33577

[21] Appl. No.: 848,816

[22] Filed: Apr. 7, 1986

[51] Int. Cl.$^4$ .................. G03B 17/24; G03B 17/02
[52] U.S. Cl. .................................. 354/105; 354/288
[58] Field of Search .................... 354/105–108, 354/288; 24/3 A, 3 R, 3 F, 3 M, 49 K, 67 AR, DIG. 11

[56] References Cited

U.S. PATENT DOCUMENTS

| | | | |
|---|---|---|---|
| 334,844 | 1/1886 | Briesen | 24/3 A UX |
| 903,283 | 11/1908 | Gray | 24/3 M X |
| 1,362,787 | 12/1920 | Gongaware | 354/108 |
| 1,370,962 | 3/1921 | Gunnill | 24/DIG. 11 X |
| 1,507,915 | 9/1924 | Goldsmith | 354/288 X |
| 2,411,328 | 11/1946 | MacNab | 24/DIG. 11 X |
| 2,547,487 | 4/1951 | Penney | 24/67 AR |
| 2,755,576 | 7/1956 | Golden | 24/67 AR X |
| 3,041,692 | 7/1962 | Olila | 24/49 K X |
| 4,361,934 | 12/1982 | Darnell | 24/3 M |

FOREIGN PATENT DOCUMENTS 637655  11/1936  Fed. Rep. of Germany ...... 354/288

*Primary Examiner*—Donald A. Griffin
*Attorney, Agent, or Firm*—Charles J. Prescott

[57] ABSTRACT

Logging of information pertaining to each separate frame of film is performed on separate sheets in a container. The base portion of the container forms a writing platform and the lid portion acts as a receptacle for the completed data sheets. Side walls on the lid help to retain the sheets while the lid is open. The sheets are provided with a readily releasable adhesive on a portion of the reverse surface so that they will adhere to the lid and to each other. The sheets may bear indicia on their obverse surface identifying data to be recorded. The container may be adhesively attached to the lens cap of the camera or otherwise made captive thereto. The container may also be made integral with the lens cap of a camera.

17 Claims, 6 Drawing Figures

PHOTOGRAPH LOGGING APPARATUS AND METHOD

BACKGROUND OF THE INVENTION

1. Field of the Invention

This invention relates generally to a method and apparatus for logging information about each photograph taken, and more particularly to a container for housing separable notes, for each photograph frame, that can be attached to finished photographs.

2. Description of Related Art

Photographers find it useful to supplement the visual information which is being recorded on film with information pertaining to picture taken. This information may be as elementary as the picture frame number and the date, or may be more technical in nature, such as the camera settings. Such information is typically recorded in some type of notebook.

U.S. Pat. No. 1,337,423, T. C. Wilson, entitled "Method of and Apparatus for Identifying Pictures", discloses camera apparatus which dispenses a ticket with each picture taken, so that both the ticket and the resulting picture will have the same number. This arrangement requires substantial structure in the camera.

U.S. Pat. No. 3,906,522, R. G. Carroll, entitled "Non-Contact Photographic Identification Device for Labeling Gamma Camera Images", provides apparatus for positioning information in the field of view of the camera so that it will appear in the picture. This apparatus requires dedication of a portion of the picture for the information.

It is therefore an object of this invention to provide photograph logging apparatus which will not require modification of the camera nor impose on the resulting photographs.

It is also an object of this invention to provide photograph logging apparatus which will permit the preparation of recorded information on separate sheets for each picture frame exposed.

It is also an object of this invention to provide photograph logging apparatus using separate sheets for each picture frame wherein the separate sheets will be releasably held in position before and after information is recorded.

It is also an object of this invention to provide a protective container for temporary storage of separate sheets on which information is recorded.

It is a further object of this invention to provide photograph logging apparatus which is made captive to a camera or other photographic apparatus.

It is another object of this invention to provide a container which permits reorganization of logging sheets.

In accordance with these and other objects, which will become apparent hereafter, the instant invention will now be described with reference to the accompanying drawings.

SUMMARY OF THE INVENTION

A container formed of substantially rigid material is provided having a base portion on which is releaseably mounted a pad of papers. Each sheet of paper has on a portion of its reverse surface a readily releasable adhesive. Each sheet of paper may also have on its obverse surface indicia of data to be recorded. The base portion of the container has no side walls about most of its periphery and, because of its rigid construction, serves as a writing support. The lid of the container includes the balance of the side walls for the container and is hinged to the base. The hinge preferably is of the type which biases the lid to either the closed or open position, depending on how far it is raised. In a preferred form, the container is made integral with a lens cap; however, it may be attached to a part of a camera or lens cap adhesively, or made captive using a shock cord.

DETAILED DESCRIPTION OF THE INVENTION

Figure 1:
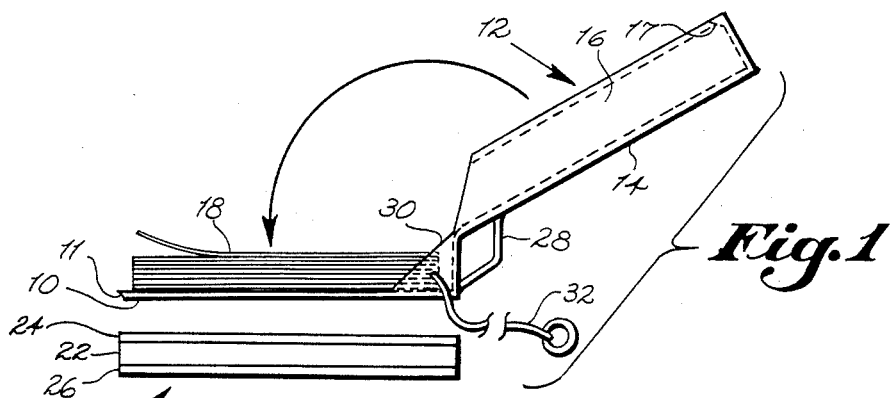
FIG. 1 is a side elevation of the apparatus of this invention.
Figure 2:
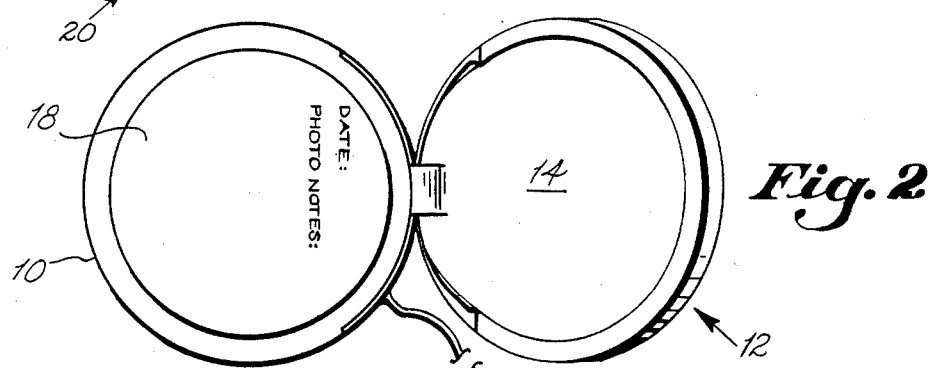
FIG. 2 is a plan view of the apparatus of FIG. 1.

Referring to FIGS. 1 and 2, in accordance with the invention, the photograph logging apparatus has a substantially rigid, flat base portion 10 with beveled edge 11. Lid portion 12, has a flat, cover area 14 and a side wall 16. Side wall 16 has beveled edge 17 designed to form a snap type closure with beveled edge 11 of base 10, thereby providing a protective seal for the container. Cover area 14 is generally coextensive with base portion 10 and they may be of any desired configuration although a circular configuration has some additional utility as will be described later It will be noted that most of flat base portion 10 has no sidewall areas to interfere with the hand or pencil during writing. The apparatus is preferably formed of a substantially rigid material such as hard nylon. A pad of logging sheets 18 is secured on flat base portion 10 using a readily releasable adhesive which will permit the removal of the bottom sheet of the pad with the application of a small amount of force. Adhesives of this type are available from 3M Company and Avery International. Each of the sheets of the pad is secured to the sheet below it using a removeable, self-sticking adhesive also available from the same sources, so as to prevent their being inadvertently removed, as by a gust of wind.

In use, when a photograph is taken, the photographer writes appropriate information about that particular photographic frame on the top sheet of pad 18. The sheets of pad 18 may contain indicia, such as shown in FIG. 2, or may be blank. Such general information as the identity of persons or places in the photo may be logged, as well as technical information such as exposure time, light conditions, etc. When the information is recorded, the photographer removes the top sheet from the pad and places it conveniently within the area provided by side wall 16 on the inside of flat, cover area 14 of cover 12 so that the adhesive on the back adheres to flat, cover area 14. The photographer repeats the procedure with each subsequent photograph—placing the completed sheets from the pad onto the preceeding sheet in cover 12, and using the adhesive on the back of the sheets to secure them in place. Side wall 16 aids in forming these sheets into a neat stack and also serves to shield the sheets placed on flat, cover area 14 from the wind. This is desirable since these used sheets will generally not lie as flat as the unused sheets on pad 18.

Also shown in FIG. 1, is disk 20. Disk 20 has a foam core 22 and adhesive surfaces 24 and 26 on each side. Disk 20 may be provided initially with removeable backings (not shown) on each adhesive surface. Adhesive surface 24 may be used to secure disk 20 to base portion 10 of the container. Adhesive surface 26 may then be used to secure the container to another surface, such as a surface on the camera.

Hinge 28 is provided which is formed when the container is injection molded in an open position. Hinge 28 is formed to provide a bias which will tend to keep cover 12 in the position shown in FIG. 1, when moved past a center equilibrium position.

Cord 32, which may be shock cord, may be connected to shoulder 30, or another convenient location, to provide a convenient means for keeping the container, and lens cap (if attached thereto), captive to the camera case, or the like. Cord 32 may also be used if the container is not secured to the camera or lens cap, or other photographic equipment.

Figure 3:
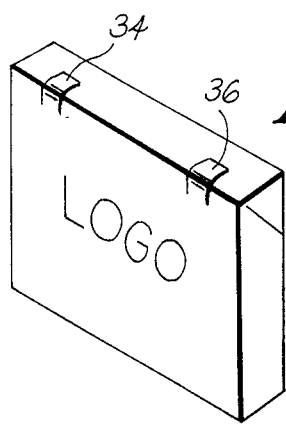
FIG. 3 is an isometric view of an alternate embodiment of the invention.

Although a circular configuration for the container is preferred when use in connection with a circular lens cap is intended, other configurations may also be used. FIG. 3 illustrates a quadrilateral base and lid configuration. Two hinges 34 and 36 are used in this embodiment, performing the same functions as the single hinge described previously.

Figure 4:
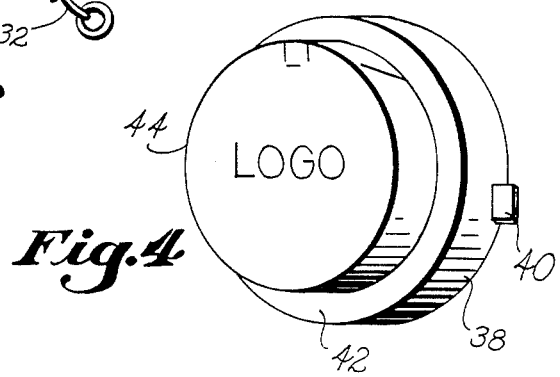
FIG. 4 is an oblique projection of another embodiment of the invention.
Figure 5:
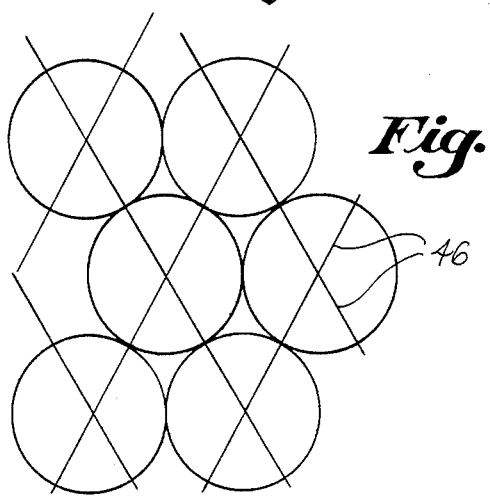
FIG. 5 shows cutting and adhesive layout for preparing the sheets used in the invention.

It is contemplated that the photograph logging apparatus of this invention may preferably be an integral part of a lens cap as is illustrated in FIG. 4. The lens cap portion 38, of the integral device includes latch element 40. The cap 42 forms the base of the container with lid 44 hinged to the cap. Lid 44 in this embodiment may bear the logo of the camera manufacturer or other logo for product recognition or use as a marketing device in displays or advertisements Referring next to FIG. 5, a possible cutting and adhesive application layout is shown. Adhesive may be applied along the diagonal lines 46 illustrated on the reverse side of the sheets thereby leaving an "X" pattern on the back of the individual circular sheets. This minimizes wasted adhesive and provides suitable adhesive areas for each circular sheet. Indicia may also be printed on large sheets before cutting. Circular pads may then be cut from a group of overlaid sheets in the pattern shown.

Figure 6:
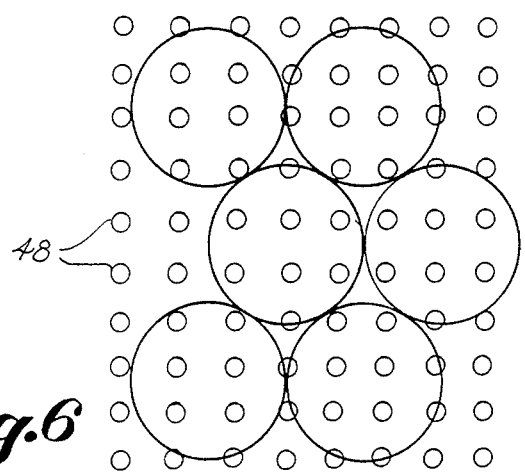
FIG. 6 shows an alternate cutting and adhesive layout.

FIG. 6 shows an alternate cutting and adhesive application layout wherein the adhesive is applied in a plurality of regularly spaced dots 48.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. Photograph logging apparatus for removably containing a pad of logging sheets comprising:
    a container;
    said container having a base portion, a lid portion and a side wall portion;
    hinge means for permitting said lid portion to move between closed and open positions with respect to said base portion and for releasably holding said lid in said open position; and
    securing means for making said container captive to another object.

2. Photograph logging apparatus for removeably containing a pad of logging sheets in accordance with claim 1 wherein:
    said lid portion of said container has said side wall portion secured thereto.

3. Photograph logging apparatus for removeably containing a pad of logging sheets in accordance with claim 1 wherein:
    said securing means for making said container captive to another object is an adhesive coated disk on the bottom of said base portion of said container.

4. Photograph logging apparatus for removeably containing a pad of logging sheets in accordance with claim 1 wherein:
    said securing means for making said container captive to another object is a length of shock cord secured to a shoulder on said base portion of said container.

5. Photograph logging apparatus for removeably containing a pad of logging sheets in accordance with claim 1 wherein:
    said base portion and said side wall portion have complementary shaped edges forming a snap closure, whereby said container provides a weatherproof housing for the logging sheets contained therein.

6. Photograph logging apparatus for removeably containing a pad of logging sheets in accordance with claim 5 wherein:
    said complementary shaped edges are beveled.

7. Photograph logging apparatus comprising:
    a container;
    said container having a base portion and a lid portion;
    a plurality of logging sheets contained in said container;
    each of said logging sheets having an obverse side for data to be recorded and a reverse side;
    at least a portion of said reverse side of said logging sheets having a readily releasable adhesive thereon; and
    said container being adhesively secured to a lens cap of a camera.

8. Photograph logging apparatus comprising:
    a container;
    said container having a base portion and a lid portion;
    a plurality of logging sheets cntained in said container;
    each of said logging sheets having an obverse side for data to be recorded and a reverse side;
    at least a portion of said reverse side of said logging sheets having a readily releasable adhesive thereon; and
    said container is formed integrally with a lens cap for a camera.

9. Photgraph logging aparatus comprising:
    a container;
    said container having a base portion and a lid portion;
    a plurality of logging sheets contained in said container;
    each of said logging sheets having an obverse side for data to be recorded and a reverse side;
    at least a portion of said reverse side of said logging sheets having a readily releasable adhesive thereon;
    said lid portion is secured to said base portion by hinge means; and said hinge means is formed integrally with said container and is biased to hold said lid portion in the closed and the open positions of said lid.

10. Photograph logging aparatus for removeably containing a pad of logging sheets comprising:

a container having a base portion and a lid portion;

hinge means for permitting said lid portion to mvoe between closed and open positions with respect to said base portion and for releasably holding said lid in said open position; and securing means for making said container captive to another object.

11. Photograph logging apparatus in accordance with claim 10 wherein:

said securing means is adhesive.

12. Photograph loging apparatus in accordance with claim 10 wherein:

said securing means is a flexible line.

13. Photograph logging apparatus in accordance with claim 10 wherein:

each of said logging sheets has an obverse side for data to be recorded and a reverse side; and at least a portion of said reverse side of said logging sheets has a readily releasable adhesive thereon.

14. Photograph logging apparatus in accordance with claim 13 wherein:

said readily releasable adhesive is in an "X" pattern.

15. Photograph logging apparatus in accordance with claim 13 wherein:

said readily releasable adhesive is in a pattern of dots.

16. Photograph logging apparatus in accordance with claim 10 wherein:

said obverse side of said logging sheets bears indicia identifying data to be recorded.

17. Photograph logging apparatus in accordance with claim 10 wherein:

said pad is adhesively secured to said base portion of said container.

* * * * *